United States Patent [19]
Sollish

[11] Patent Number: 6,104,679
[45] Date of Patent: Aug. 15, 2000

[54] METHOD FOR DETERMINING AN UNAUTHORIZED COPY OF AN OPTICAL DISC

[75] Inventor: Baruch Sollish, Emmanuel, Israel

[73] Assignee: T.T.R. Technologies Ltd., Kfar Saba, Israel

[21] Appl. No.: 09/164,751

[22] Filed: Oct. 1, 1998

[51] Int. Cl.$^7$ .................................................. G11B 17/22
[52] U.S. Cl. .................................................. 369/33
[58] Field of Search .............................. 369/33, 32, 58, 369/84, 275.3, 275.4, 14

[56] References Cited

U.S. PATENT DOCUMENTS

| | | | |
|---|---|---|---|
| 5,570,339 | 10/1996 | Nagano | 369/275.3 |
| 5,572,507 | 11/1996 | Ozaki et al. | 369/275.4 |
| 5,696,757 | 12/1997 | Ozaki et al. | 369/275.4 |
| 5,787,068 | 7/1998 | Arps et al. | 369/275.3 |
| 5,809,006 | 9/1998 | Davis et al. | 369/275.4 |
| 5,812,501 | 9/1998 | Moribe et al. | 369/14 |
| 5,875,156 | 2/1999 | Ito et al. | 369/32 |
| 5,881,038 | 3/1999 | Oshima et al. | 369/59 |
| 5,930,209 | 7/1999 | Spitzenberger et al. | 369/32 |

*Primary Examiner*—Tan Dinh
*Attorney, Agent, or Firm*—Darby & Darby

[57] ABSTRACT

A method of authenticating a Compact Disc, to distinguish an original Compact Disc from an unauthorized copy thereof. One or more invalid symbols are written into the subcode of the original Compact Disc, such one affecting the Q-channel, by using special equipment. The Q-channel normally contains only track location information whose format and content are precisely defined by the applicable standards, and thus ordinary consumer Compact Disc recording equipment does not receive external Q-channel input, but rather generates Q-channel data internally when recording. Therefore, invalid symbols affecting the Q-channel of an original Compact Disc cannot be copied by ordinary consumer Compact Disc recording equipment. Consequently, the presence of data in the Q-channel of a Compact Disc serves to distinguish an original Compact Disc from an unauthorized copy thereof. Invalid symbols include both symbols with incorrect values as well as bistable symbols, which cannot be copied by most professional mastering equipment. The present invention discloses methods for reading the Q-channel to determine the presence or absence of predetermined invalid data.

4 Claims, 10 Drawing Sheets

METHOD FOR DETERMINING AN UNAUTHORIZED COPY OF AN OPTICAL DISC

FIELD AND BACKGROUND OF THE INVENTION

The present invention relates to methods of media authentication, and, more particularly, to a method for authenticating Compact Disc digital optical media.

The term "Compact Disc" herein denotes digital optical media including, but not limited to, media such as Compact Disc Audio (CD) and Compact Disc Read-Only Memory (CD-ROM). The Compact Disc is well-known in the art and has become common for a broad variety of important data storage and information distribution applications. In particular, certain proprietary materials such as computer software, specialized data, and audio/video content are commonly sold and distributed on Compact Disc.

Compact Disc technology is established according to a series of international publications, herein referred to as "standards", all of which are incorporated herein by reference as if set forth fully herein. For example, some common standards applicable to CD's include: the International Standards Organization (ISO) standard 9660 entitled "Information Processing—Volume and File Structure of CD-ROM for Information Interchange, ISO Standard 13490-1", the International Electrotechnique Commission (CEI-IEC) standard 908, generally conforming to what is known as the "Red Book", and ISO/IEC 10140, generally conforming to what is known as the "Yellow Book". A useful summary of the various standards and data formats is found in *Compact Disc Terminology*, by Busk, Summers, Langer, and Fricks, published by Disc Manufacturing, Inc., Wilmington, Del.

Software and document data may be read and utilized by a computer from CD-ROM, and there are widely-available players for reading data from CD-ROM and using this data to reconstruct audio, visual, text, and audio-visual information. The term "player" herein denotes any device which is able to read data from Compact Disc. Players include, but are not limited to, CD players, CD-ROM multi-media players, DVD players, and game-playing systems, which can reproduce sound, images, and text from data stored on CD. Some computers are also configured with hardware and software capable of accessing CD, to duplicate the functionality of CD players, CD-ROM multi-media players, and game-playing systems.

Unfortunately, it is easy to copy proprietary material from an original Compact Disc Compact Disc and thereby produce an unauthorized copy whose sale and distribution cannot be controlled by the owner of the proprietary material. Individual users can freely copy such proprietary material using low-cost consumer devices such as CD-R recorders (herein referred to as "ordinary consumer Compact Disc recording equipment"), and it is also possible to mass-produce unauthorized copies of proprietary material using equipment such as commercial mastering, pressing, and stamping apparatus (herein referred to as "commercial replicating equipment"). It is usually difficult or impossible to enforce copyright laws in such cases, especially in the case of widespread copying by consumers using ordinary consumer Compact Disc recording equipment, and the legitimate owner of the proprietary material is thereby deprived of the legal right to control the sale and distribution of the proprietary material. The term "original Compact Disc" as used herein refers to an instance of a Compact Disc which has been authorized by and issued under the control of the owner of the proprietary material recorded thereon. In contrast, the term "unauthorized copy" herein denotes an instance of a Compact Disc which has derived from an original Compact Disc via copying that has neither been authorized by nor is under control of the owner of the proprietary material recorded thereon.

Thus, there is a widely-recognized need for a means of distinguishing an original Compact Disc from an unauthorized copy, and especially, there is a widely-recognized need for a means of automatically distinguishing an original Compact Disc from an unauthorized copy. The term "automatically distinguish" herein denotes a means of distinguishing an original Compact Disc from an unauthorized copy in such a way that does not require visual inspection or other human intervention. In particular, automatically distinguishing an original Compact Disc from an unauthorized copy ideally should be feasible by a player as it reads the Compact Disc. That is, whatever distinguishing features are placed on an original Compact Disc for identification as an original Compact Disc, the distinguishing features must be machine-readable. The terms "authenticate", "authentication", and "authenticating" herein refer to any process by which an undetermined instance of a Compact Disc corresponding to an original Compact Disc can be differentiated to be an original Compact Disc as distinct from an unauthorized copy of an original Compact Disc. The term "original Compact Discs to be authenticated" herein denotes all authorized copies which may be derived from a specific original Compact Disc for which the owner of the proprietary material recorded thereon wishes to have means of authentication. The term "undetermined" herein denotes that a specific instance of a Compact Disc is not yet known to be an original Compact Disc as distinct from an unauthorized copy. The term "corresponding to" herein denotes that a specific instance of a Compact Disc contains the same functional data or information as a given original Compact Disc. It will be appreciated that an unauthorized copy of a Compact Disc can appear to be an original Compact Disc even under close physical examination. In addition, it will be appreciated that the data or information content of an unauthorized copy of a Compact Disc can be identical to that of an original Compact Disc. Hence, until a satisfactory authentication process is completed, it will be appreciated that every instance of a Compact Disc from the set of all copies of original Compact Discs to be authenticated can be considered to be undetermined.

In addition to allowing a player to identify the Compact Disc being played as an original Compact Disc rather than an unauthorized copy, a method for authenticating an undetermined Compact Disc can allow the player to selectively access proprietary material only if the Compact Disc is an original Compact Disc, and deny access to the proprietary material if the Compact Disc is an unauthorized copy. Such selective access is a means of copy protection, and can be implemented through various techniques well-known in the art, such as by encrypting the proprietary material and storing a decryption key on the original Compact Disc in such a way that the decryption key is not readily copyable. The presence of a valid decryption key on a Compact Disc therefore is intended to automatically distinguish the Compact Disc as an original Compact Disc, and moreover to provide copy protection by allowing the player access to the proprietary material only if the Compact Disc is an original Compact Disc. The term "copy protection" herein denotes any method or system which either prevents the making of an unauthorized copy or renders an unauthorized copy useless for its intended application.

There are currently a number of schemes which attempt to automatically distinguish an original Compact Disc from an unauthorized copy by storing a special pattern, such as a decryption key, on the Compact Disc in such a way that the special pattern is not readily copyable. For example, U.S. Pat. No. 5,400,319 to Fite et al. ("CD-ROM with Machine-Readable I.D. Code") discloses the use of a laser to selectively destroy portions of the reflective layer of the CD-ROM, thereby creating addressable defects in which a serial number may be encoded. U.S. Pat. No. 5,563,947 to Kikinis ("CD-PROM") discloses a similar use of a laser to physically damage selected sectors and thereby produce a pattern of unreadable sectors in which a decryption key may be stored. And U.S. Pat. No. 5,703,858 to Mitchell et al. ("System for Encoding a Glass Master to Enable Detection of a Counterfeit Optical CD-ROM") discloses the use of a high-frequency random modulation of a laser to produce random defects in the CD-ROM at the master level by selective destruction of predetermined sectors. All of these techniques, as well as other currently-available commercial techniques for copy-protecting a Compact Disc, involve creating damaged or otherwise unreadable portions of the Compact Disc. The theory behind such techniques is that ordinary consumer Compact Disc recording equipment is not intended to produce defects in the recorded copies made therewith, and therefore an unauthorized copy produced on such equipment should lack the unreadable areas in which the decryption key or other pattern is encoded. If this were in fact reliably the case, then such techniques would provide means for authenticating an undetermined Compact Disc. The present inventor, however, has found that it is possible to reproduce unreadable sectors in a copy by using ordinary consumer Compact Disc recording equipment with the appropriate software. Thus, a person with access to such appropriate software would be able to easily defeat such schemes relying on unreadable sectors and thereby create an unauthorized copy of a Compact Disc which will be incorrectly discerned by these authenticating schemes to be an original Compact Disc. In effect, all the schemes currently known in the art for providing copy protection of Compact Disc by encoding patterns in damaged or unreadable data areas are of limited value in distinguishing an original Compact Disc from an unauthorized copy and offer only limited protection against making unauthorized copies.

International Publication No. WO 98/08180 of PCT/IL97/00266 by the present inventor et al., which is incorporated by reference for all purposes as if fully set forth herein, discloses a method for authenticating digital optical media by recording and reading two classes of invalid symbols on the digital optical media. One class of invalid symbol is referred to as an "ambiguous symbol". An ambiguous symbol is a non-standard symbol, and is characterized by having two distinct data values instead of a single data value (an ambiguous symbol may therefore also be referred to as a "bistable symbol", and these two terms are herein interchangeable). Having a single data value is a characteristic of a standard symbol. When reading an ambiguous symbol, however, the physics of the reading process is such that one of the two distinct data values is read randomly. An ambiguous symbol may be detected by reading a given symbol a number of times and comparing the results. If the same data value always is returned, the given symbol is a standard symbol. In contrast, if different data values are returned, then the given symbol is an ambiguous symbol. Hence, an ambiguous symbol encodes invalid data herein termed "ambiguous data". Writing ambiguous symbols requires special hardware, and therefore ambiguous symbols are not reproducible by ordinary digital optical media recording equipment. Consequently, the presence or absence of these ambiguous symbols serves to confirm or deny, respectively, the authenticity of a specific instance of digital optical media: provided that the original digital optical media were produced with these ambiguous symbols, then a specific instance of the digital optical media having the ambiguous symbols may be determined to be authentic, whereas a specific instance of the digital optical media lacking the ambiguous symbols may be determined to be an unauthorized copy. In order to make a determination of the authenticity of a specific instance of digital optical media, the it must be possible to detect the presence of the ambiguous symbols using an ordinary player of the digital optical media. Ambiguous symbols, however, are considered according to the standards to be errors, and the player's error-correcting mechanism attempts to correct the ambiguous symbols to have a single value. If the player is successful in correcting ambiguous symbols, then ambiguous symbols will not be detectable using that player. Therefore, International Publication No. WO 98/08180 of PCT/IL97/00266 also discloses a method of overriding the error-correction of a player by recording a second class of invalid symbols on the original digital optical media in such a way as to disable the error-correcting mechanism for the ambiguous symbols. (A symbol belonging to this second class of invalid symbols is herein referred to as an "undefined symbol", and is characterized by not having a data value assignment in the standards. There are a total of nine such undefined symbols for Compact Disc, and they are immediately detected as invalid symbols by a Compact Disc player, as opposed to invalid symbols which are defined in the standards, but which have incorrect data values and which require processing by the player's error-detection mechanism and/or error-correcting mechanism in order for the player to detect them as invalid symbols.) Unfortunately, however, the published standards for digital optical media contain specifications for only the digital optical media and do not contain any specifications for players of the digital optical media. Consequently, there are no universal standards for players of digital optical media. As a result, the capabilities of the players vary considerably from one player to another, and therefore the method disclosed in International Publication No. WO 98/08180 of PCT/IL97/00266 may not work with all players of digital optical media. With certain players, it may not be possible to detect ambiguous symbols because of the specific error-correcting mechanisms of those players.

Therefore, it would be highly advantageous to have a method and system for authenticating an undetermined digital optical media which cannot be defeated utilizing commercially-available copying equipment, regardless of the software employed, and which will be usable with all players of the digital optical media. This goal is met by the present invention for use with Compact Disc digital optical media.

SUMMARY OF THE INVENTION

The present inventor has realized that the difficulty in detecting ambiguous symbols recorded on digital optical media using certain players is a result of differences in the error-correcting mechanisms employed by those players. Although the mathematical algorithms of the error-correcting mechanisms are specified in the standards for digital optical media, there are many different ways of implementing the algorithms, and this means that a way of overriding error correction that works for one player may not work for another player. To overcome this problem so that an authentication method using ambiguous symbols will be usable on all players of the digital optical media, it is necessary to bypass the error-correcting mechanisms altogether. For example, if ambiguous symbols can be recorded onto digital optical media according to the published specifications of the digital optical media, but in such a way that they are not subject to error-correcting mechanisms, then it will be possible to detect those ambiguous symbols using any player of the digital optical media. The present inventor has realized that the published specifications for Compact Disc digital optical media provide for a limited amount of recorded data that is entirely free of error-correcting mechanisms. This is in a formatting area known as the "subcode for the control and display system", as specified in the "Red Book". Hereinafter this formatting area is referred to as the "subcode" for brevity.

According to the prior art standards, the subcode has eight channels, labeled "P", "Q", "R", "S", "T", "U", "V", and "W", each of which holds one bit of usable data per frame in 96 consecutive frames in each sector of a Compact Disc. The various channels are used to contain information related to the track selection control and display for Compact Disc Audio, and have no error correction, because little information is contained therein and is moreover repeated over a large area, thereby providing adequate redundancy in case of errors. There is a CRC error detection capability, so that if there is an error in the data, the error is detectable, but there are no error-correcting mechanisms to correct any errors. Furthermore, this CRC error detection capability may be disabled in at least some players by forcing the CRC remainder to zero. Thus, invalid symbols recorded in the subcode will not be altered by any error-correcting mechanisms. Consequently, it is possible to place invalid symbols, in a subcode so that it affects one or more channels by inserting invalid data into those channels, and in a preferred embodiment of the present invention, the "Q-channel" is chosen to be affected by the invalid symbols. That is, the Q-channel is chosen to contain invalid data corresponding to one or more invalid symbols. The term "invalid symbol" hereinafter denotes not only any symbol which does not conform to the symbol encoding standards for Compact Disc (such as an ambiguous symbol), but also denotes any symbol which is inappropriate or otherwise erroneous according to the standards for Compact Disc. Invalid symbols according to the present invention include, but are not limited to, ambiguous symbols, undefined symbols, and incorrect symbols. The term "incorrect symbol" herein denotes any symbol which conforms to the symbol encoding standards for Compact Disc, but which encodes an incorrect data value. As previously noted, the term "undefined symbol" herein denotes any symbol which does not have a data value assignment in the standards.

Moreover, the present inventor has realized that it is possible to provide a degree of authentication for a Compact Disc by using only incorrect symbols as invalid symbols, without the use of any ambiguous symbols. The degree of authentication when using only incorrect symbols is not as good as when using ambiguous symbols, but it serves to automatically distinguish an original Compact Disc from an unauthorized copy made by ordinary consumer Compact Disc recording equipment.

Therefore, according to the present invention there is provided a method for authenticating an undetermined instance of a Compact Disc as being an original Compact Disc distinct from an unauthorized copy thereof, the undetermined instance selected from the set of all copies of Compact Discs corresponding to original Compact Discs to be authenticated, the method including the steps of: (a) recording at least one invalid symbol as a control and display symbol on all original Compact Discs to be authenticated, the at least one invalid symbol selected from the group consisting of incorrect symbols, undefined symbols, and ambiguous symbols, the recording being in a predetermined location on the all original Compact Discs to be authenticated; (b) reading the control and display symbol of the undetermined instance in the predetermined location; (c) comparing the control and display symbol from the reading with the at least one invalid symbol of the recording; and (d) determining the undetermined instance to be an original Compact Disc if the control and display symbol from the reading is the same as the at least one invalid symbol of the recording, and determining the undetermined instance to be an unauthorized copy if the control and display symbol from the reading is different from the at least one invalid symbol of the recording.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method which can be used to authenticate a Compact Disc. Specifically, the present invention can be used as part of a method of copy protection for proprietary materials on CD-ROM. The principles and operation of a method according to the present invention may be understood with reference to the drawings and the accompanying description.

Figure 1:
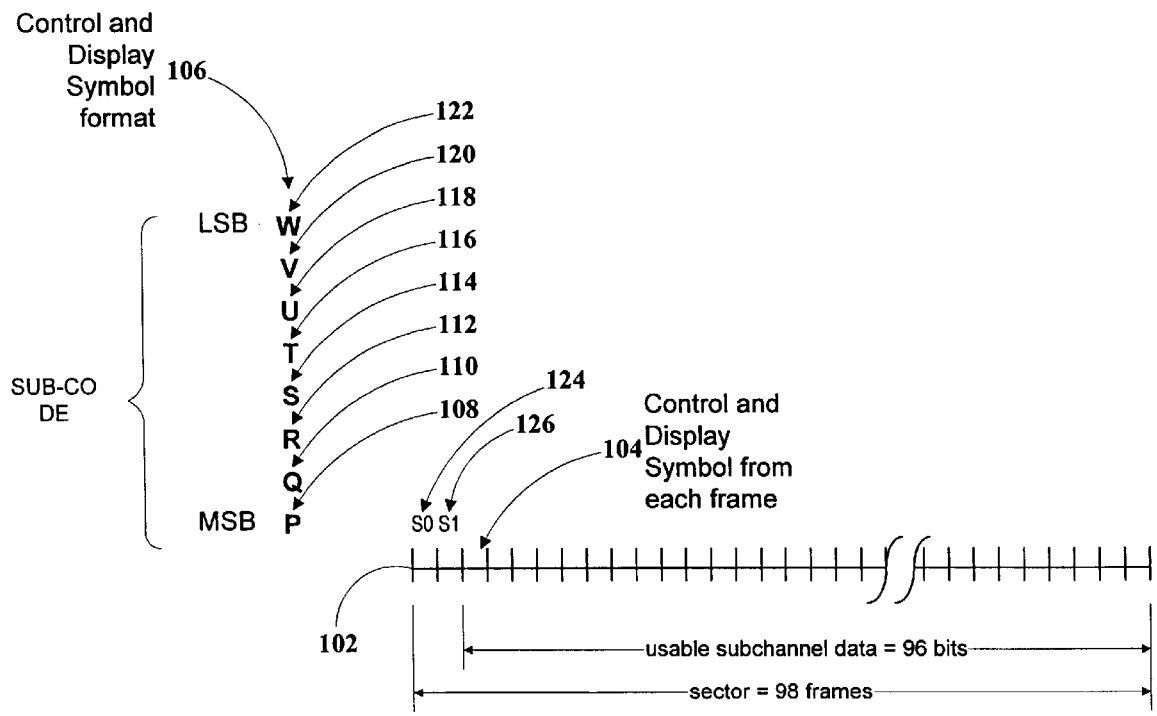
FIG. 1 shows the prior art format of the subcode channels for Compact Disc media.

Referring now to the drawings, FIG. 1 illustrates the prior art format of the subcode channels for Compact Disc media. Within each sector 102 of the Compact Disc, there are 98 frames. The first symbol of each frame is a control and display symbol 104. The first two frames contain a synchronization pattern made of special symbols S0 124 and S1 126, respectively, as the control and display symbols for those frames. Special symbols S0 124 and S1 126 are used only for synchronization and carry no information. The remaining 96 frames contain control and display symbols according to a subcode control and display symbol format 106, including a P-channel 108, a Q-channel 110, an R-channel 112, an S-channel 114, a T-channel 116, a U-channel 118, a V-channel 120, and a W-channel 122, each of which has 1 bit of control and display symbol 104 in each of the 98 frames of sector 102. As noted, W-channel 122 uses the least significant bit (LSB) of control and display symbol 104, and P-channel 108 uses the most significant bit (MSB) of control and display symbol 104.

Figure 2:
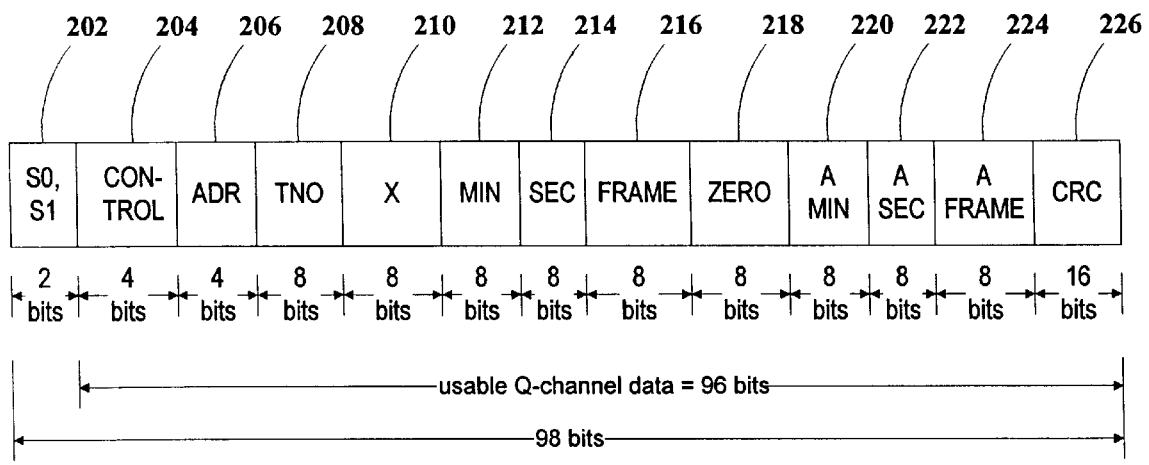
FIG. 2 shows the data content of a prior art Q-channel in Compact Disc media.

FIG. 2 illustrates the data content of a prior art Q-channel in Compact Disc media. There are various uses of the Q-channel. In one non-limiting embodiment, the Q-channel mode used contains, in the following order, two subcoding synchronization pattern bits 202 which contain bits from special symbols S0 and S1 (2 bits), a control field 204 (CONTROL, 4 bits), an address field 206 (ADR, 4 bits), a track number field 208 (TNO, 8 bits), a track number index field 210 (X, 8 bits), a track-time minutes field 212 (MIN, 8 bits), a track time seconds field 214 (SEC, 8 bits), a track time frame field 216 (FRAME, 8 bits), a field of zero bits 218 (ZERO, 8 bits), an absolute time minutes field 220 (A MIN, 8 bits), an absolute time seconds field 222 (A SEC, 8 bits), an absolute time frame field 224 (A FRAME, 8 bits), and a cyclic redundancy check field 226 (CRC, 16 bits). The format for the time fields is binary-coded decimal (BCD), and the values of track time frame field 216 and absolute time frame field 224 both range from 00 to 74 BCD, because each second of Compact Disc Audio running time requires 75 sectors. It is important to note that absolute time minutes field 220, absolute time seconds field 222, and absolute time frame field 224 together specify the approximate sector address on the Compact Disc of this particular Q-channel data. According to the standards, the sector address specified by the Q-channel data in this way must be within 1 second (±1 second) of the actual sector address. This fact is important when reading the Q-channel to detect the presence of invalid data, as is described below.

[Note that the prior art standards utilize the term "channel" in the context of the subcode to denote one of the eight channels "P" through "W" as detailed above, and this is not to be confused with the term "channel bit" (also utilized by the standards) to refer to a subdivision of a symbol. Note also that the standards utilize the term "FRAME" in the context of time (field 216 and field 224) to refer to the division of a second into 75 sectors per second, and this is not to be confused with the term "frame" (also utilized by the standards) to refer to a subdivision of a sector, containing 588 channel bits. These terms are separate, with well-understood meanings as known in the art.]

According to the method of the present invention, one or more invalid symbols are written as control and display symbols. These invalid symbols introduce invalid data into one or more subcode channels which can be detected on playback, but ordinary consumer Compact Disc recording equipment is unable to reproduce these invalid symbols. Many combinations and variations of writing invalid symbols are possible, using the various fields of one or more subcode channels. The preferred embodiments mentioned and described in detail herein are non-limiting examples.

In a non-limiting embodiment of the present invention, invalid symbols are written such that invalid data is introduced into the Q-channel. In another non-limiting embodiment, one or more invalid symbols are written such that invalid data is introduced into absolute time seconds field 222. It is also possible to introduce invalid data into relative time seconds field 214. In still another non-limiting embodiment, a plurality of invalid symbols are written as the control and display symbol over a span of sectors. In yet another non-limiting embodiment, this span of sectors is contiguous. As an example, a plurality of invalid symbols are written as control and display symbols such that invalid data is introduced into absolute time seconds field 222 in a span of 75 contiguous sectors. Writing into a span of sectors assures that it will be possible to efficiently read the invalid data upon playback, as described below, and therefore detect the presence of the invalid symbols. In a further embodiment of the present invention, invalid symbols such as incorrect symbols are written as control and display symbols affecting CRC field 226 (FIG. 2) such that CRC field 226 is set to zero. In still a further embodiment of the present invention, an invalid symbol can be simply an incorrect symbol or an ambiguous symbol as disclosed in International Publication No. WO 98/08180 of PCT/IL97/00266.

The reason that ordinary consumer Compact Disc recording equipment cannot precisely duplicate the invalid symbols written as control and display symbols is that certain subcode channels are not used for regular information storage, but rather for control and display purposes only. According to the standards for Compact Disc, moreover, certain aspects of the format of the Q-channel are precisely specified. Thus, ordinary consumer Compact Disc recording equipment typically generates certain Q-channel data internally according to the standards and therefore does not receive any external data input regarding the Q-channel. A method and special apparatus for writing arbitrary invalid symbols, including ambiguous symbols, onto any location of digital optical media, including the control and display symbols of a Compact Disc, is disclosed in International Publication No. WO 98/08180 of PCT/IL97/00266. This method and special apparatus suffices to write invalid symbols, such as ambiguous symbols, onto original Compact Discs, so that they may be authenticated. The highly specialized nature of this method and special apparatus, however, precludes the general availability of means for writing invalid symbols, such as ambiguous symbols, in ordinary consumer Compact Disc recording equipment. Ordinary consumer Compact Disc recording equipment has therefore a limited ability to write invalid symbols as control and display symbols. It is possible to take advantage of this such that invalid data is written into the Q-channel in a manner that ordinary consumer Compact Disc recording equipment cannot readily duplicate.

Figure 3:
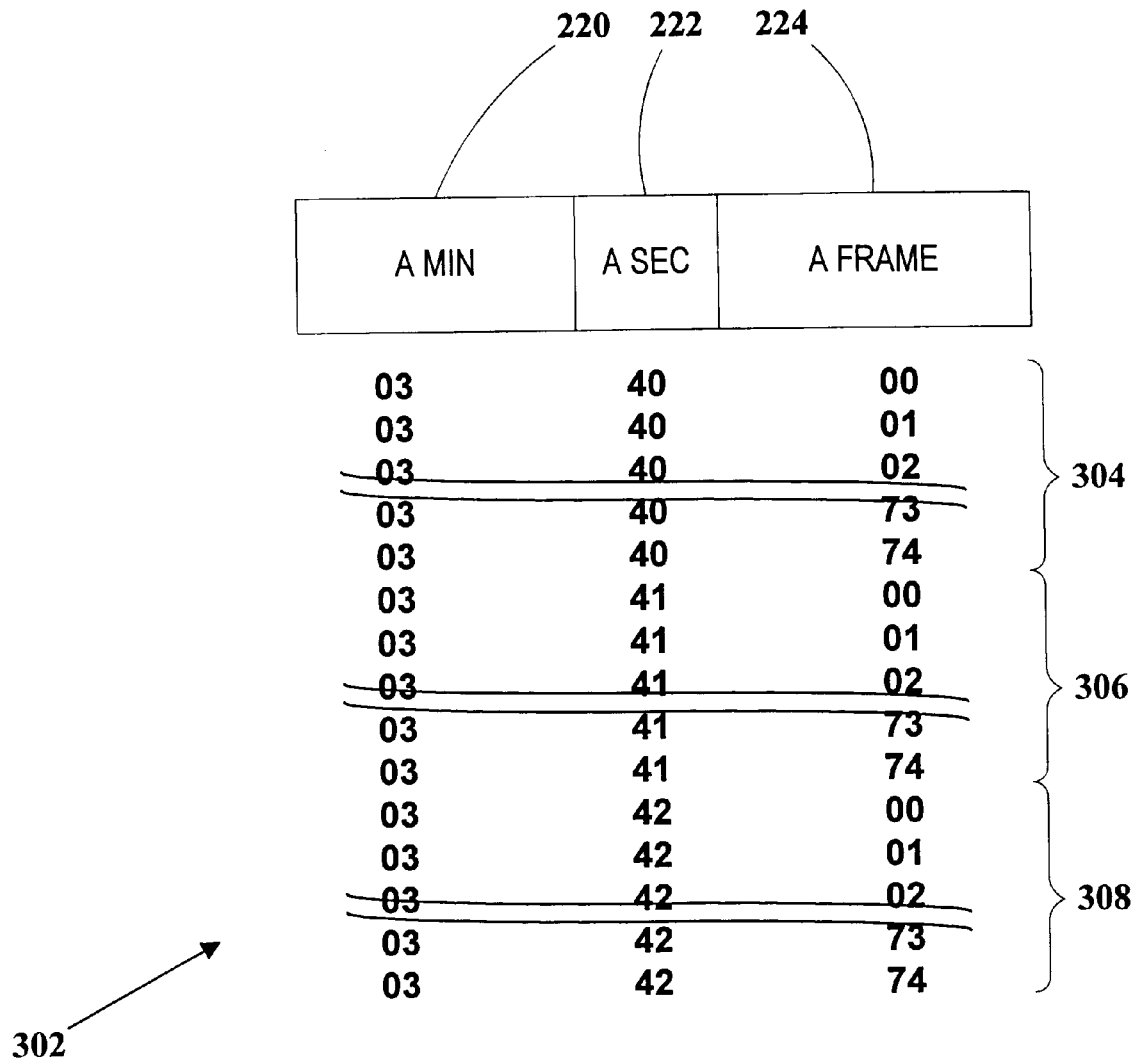
FIG. 3 shows an example of the normal data contents of the A MIN, A SEC, and A FRAME fields of a prior art Compact Disc Q-channel.

Following is an example of an embodiment of the present invention for writing invalid symbols as control and display symbols such that invalid data is introduced into the Q-channel in such a way that a Compact Disc containing these invalid symbols may be authenticated. First, reference to FIG. 3 illustrates an example of a prior art normal sequence 302 of data in A MIN field 220, A SEC field 222, and A FRAME field 224 according to the standards. Normal sequence 302 corresponds to a portion of the data track from the first sector (sector 0) of an absolute playing time of 3 minutes, 40 seconds to the final sector (sector 74) of an absolute playing time of 3 minutes, 42 seconds. A group 304 contains 75 sectors of data corresponding to absolute playing time of 3 minutes, 40 seconds, a group 306 contains 75 sectors of data corresponding to absolute playing time of 3 minutes, 41 seconds, and a group 308 contains 75 sectors of data corresponding to absolute playing time of 3 minutes, 42 seconds. (For brevity and clarity, only the beginning and ending sector data is shown for each group in FIG. 3.) Normal sequence 302 is what would be recorded onto a Compact Disc made by ordinary consumer Compact Disc recording equipment for the range of absolute playing times in this example.

Figure 4:
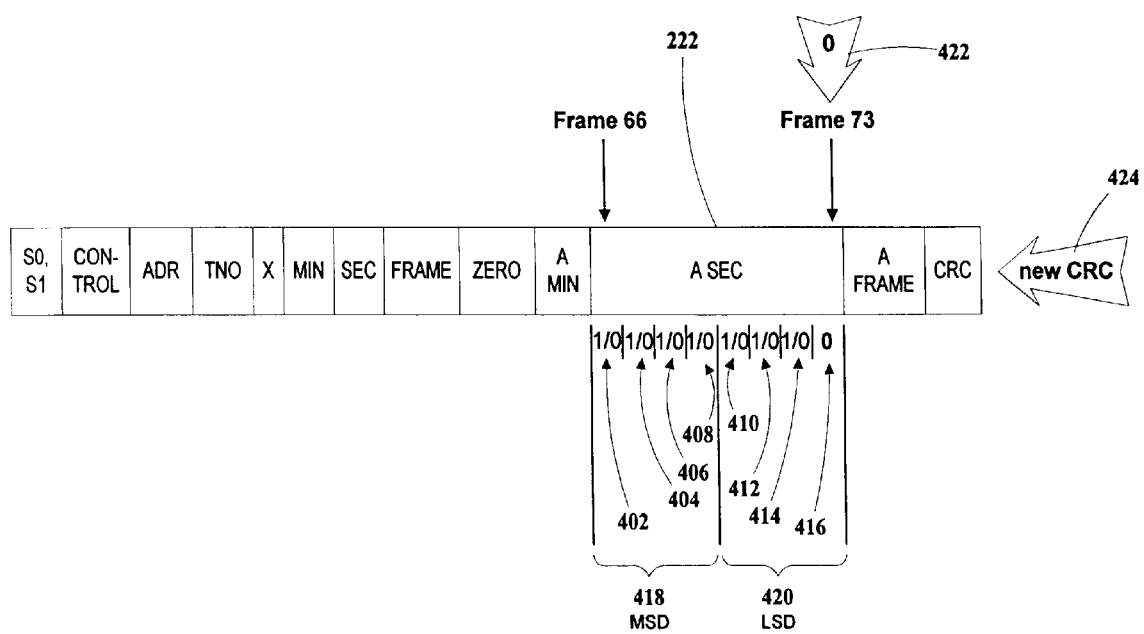
FIG. 4 shows an example of writing invalid data into the Q-channel of a Compact Disc with an incorrect symbol.

FIG. 4 illustrates an example of writing an incorrect symbol as the control and display symbol such that the Q-channel contains invalid data. The incorrect symbol is written so that A SEC field 222 will have the invalid data. According to the standards, A SEC field 222 takes eight bits of data starting with the control and display symbol of frame 66 (MSB) and ending with the control and display symbol of frame 73 (LSB), corresponding as shown to a more significant digit (MSD) 418 and a less significant digit (LSD) 420. MSD 418 and LSD 420 are formatted as binary-coded decimal according to the standards. The eight bits of A SEC field 222 are denoted in descending significance as a bit 402, a bit 404, a bit 406, a bit 408, a bit 410, a bit 412, a bit 414, and a bit 416. In this embodiment of the present invention, a zero bit is overwritten into bit 416 by a writing operation 422, which writes an incorrect symbol as a control and display symbol into frame 73 of a series of sectors, utilizing, for example, the method for writing invalid symbols as disclosed in International Publication No. WO 98/08180 of PCT/IL97/00266. The invalid symbol in this case is an incorrect symbol whose Q-channel bit 110 (FIG. 1) is zero. Doing so will put invalid data into A SEC field 222 wherever the LSB of A SEC field should be a 1. That is, an odd value of A SEC field 222 is changed into an even value. In order to prevent the invalid data from being detected as an error, a writing operation 424 substitutes one or more invalid symbols such as incorrect symbols containing a new CRC which takes the invalid data into account. The calculating of the new CRC is done according to methods specified in the standards for Compact Disc, and is well-known in the art. The writing of the new CRC is done according to the same methods disclosed in International Publication No. WO 98/08180 of PCT/IL97/00266. It should be noted that when writing invalid data into a specific subcode channel (such as the Q-channel) using an incorrect symbol, it is always possible to write invalid data into that specific subcode channel while not affecting any of the other subcode channels. That is, all subcode channels are independent if the invalid symbol is an incorrect symbol.

Figure 5:
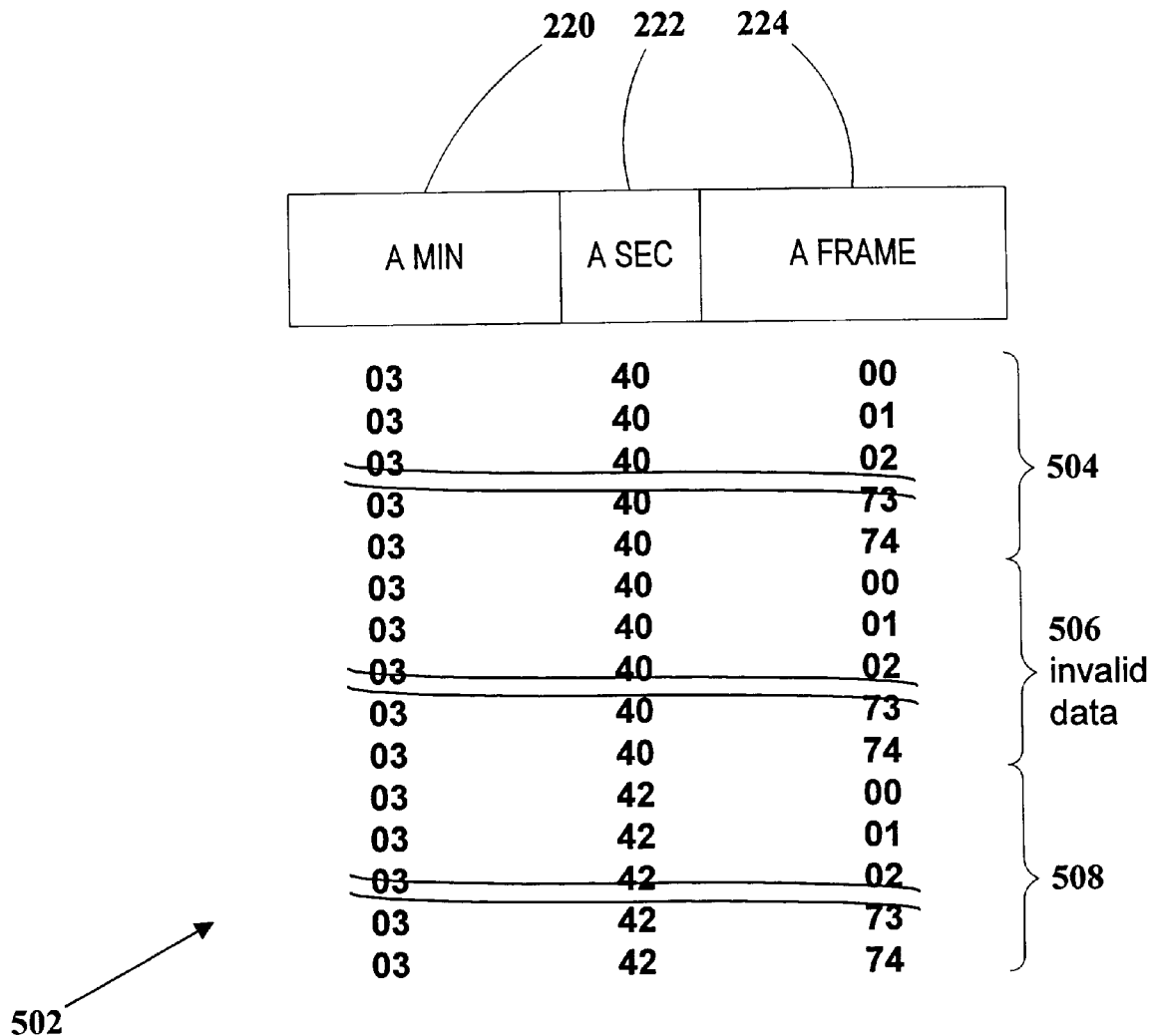
FIG. 5 shows an example of invalid data contents of the A MIN, A SEC, and A FRAME fields of a Compact Disc Q-channel according to the present invention.

The results of the writing of incorrect symbols as control and display symbols, as described above, are shown in FIG. 5, which shows the invalid data in A SEC field 222, corresponding to an invalid sequence 502. A normal group 504 contains 75 sectors of data correctly corresponding to absolute playing time of 3 minutes 40 seconds, and a normal group 508 contains 75 sectors of data correctly corresponding to absolute playing time of 3 minutes, 42 seconds. (For brevity and clarity, only the beginning and ending sector data is shown for each group in FIG. 5.) Comparing FIG. 5 with FIG. 3, however, it is readily seen that, an invalid group 506 which contains 75 sectors of data does not correspond to absolute playing time of 3 minutes, 41 seconds as does group 306 of FIG. 3, because invalid group 506 incorrectly shows an absolute playing time of 3 minutes 40 seconds instead of 3 minutes 41 seconds. This is the result of the writing of an incorrect symbol as the control and display symbol in frame 73 (as described above and illustrated in FIG. 4) in a series of 75 consecutive sectors. Invalid sequence 502 cannot normally be duplicated onto a Compact Disc by ordinary consumer Compact Disc recording equipment. Thus, if an original Compact Disc is produced with invalid data in the Q-channel as described above, such an original Compact Disc can be automatically distinguished from an unauthorized copy thereof, because unauthorized copies will have a Q-channel sequence as shown in FIG. 3, whereas the original Compact Discs will have a Q-channel sequence as shown in FIG. 5.

Figure 6:
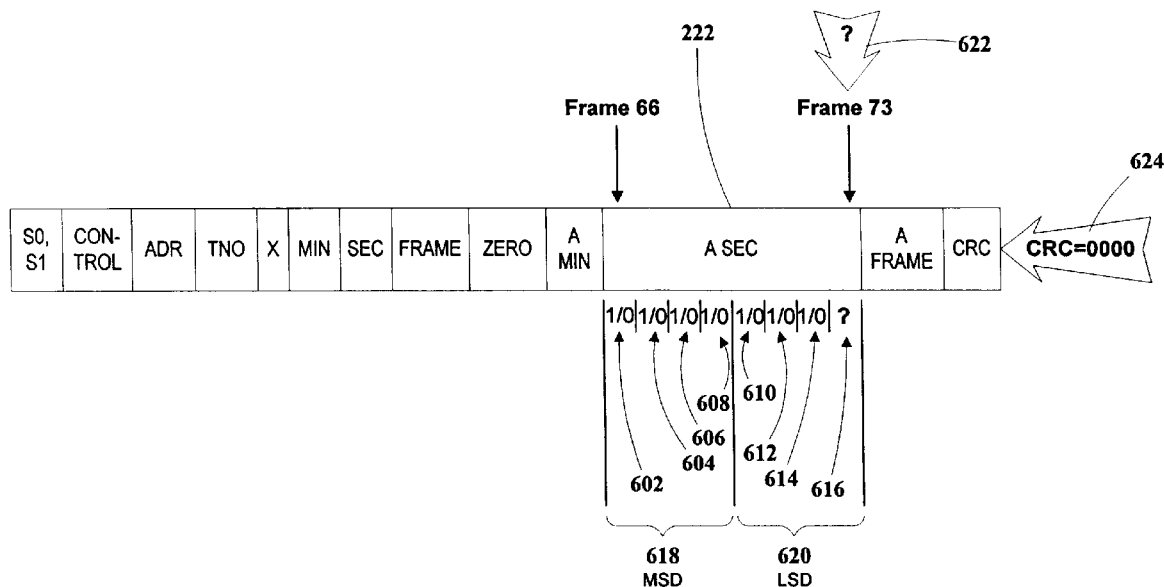
FIG. 6 shows an example of writing invalid data into the Q-channel of a Compact Disc with an ambiguous symbol.

In a similar manner, it is possible to write an ambiguous symbol as the control and display symbol in order to introduce invalid data into a subcode channel, such as the Q-channel. This is illustrated in FIG. 6, to which reference is now made. The ambiguous symbol is written so that A SEC field 222 will have ambiguous data. According to the standards, A SEC field 222 takes eight bits of data starting with the control and display symbol of frame 66 (MSB) and ending with the control and display symbol of frame 73 (LSB), corresponding as shown to a more significant digit (MSD) 618 and a less significant digit (LSD) 620. MSD 618 and LSD 620 are formatted as binary-coded decimal according to the standards. The eight bits of A SEC field 222 are denoted in descending significance as a bit 602, a bit 604, a bit 606, a bit 608, a bit 610, a bit 612, a bit 614, and a bit 616. In this embodiment of the present invention, an ambiguous (or "bistable") bit is overwritten into bit 616 by a writing operation 422, which writes an ambiguous symbol as a control and display symbol into frame 73 of a series of sectors, utilizing, for example, the method for writing invalid symbols as disclosed in International Publication No. WO 98/08180 of PCT/IL97/00266. The ambiguous symbol in this case is such that Q-channel bit 110 (FIG. 1) is ambiguous; that is, Q-channel bit 110 is bistable, randomly reading with a value of 0 or 1. Doing so will put ambiguous data into A SEC field 222. In order to prevent the invalid data from being detected as an error, a writing operation 624 substitutes a CRC of zero (0000). The writing of the zero CRC is done according to the same methods disclosed in International Publication No. WO 98/08180 of PCT/IL97/00266. It should be noted that when writing invalid data into a specific subcode channel (such as the Q-channel) using an incorrect symbol, it is not always possible to write invalid data into that specific subcode channel while not affecting any of the other subcode channels. That is, subcode channels are not independent if the invalid symbol is an ambiguous symbol.

Figure 7:
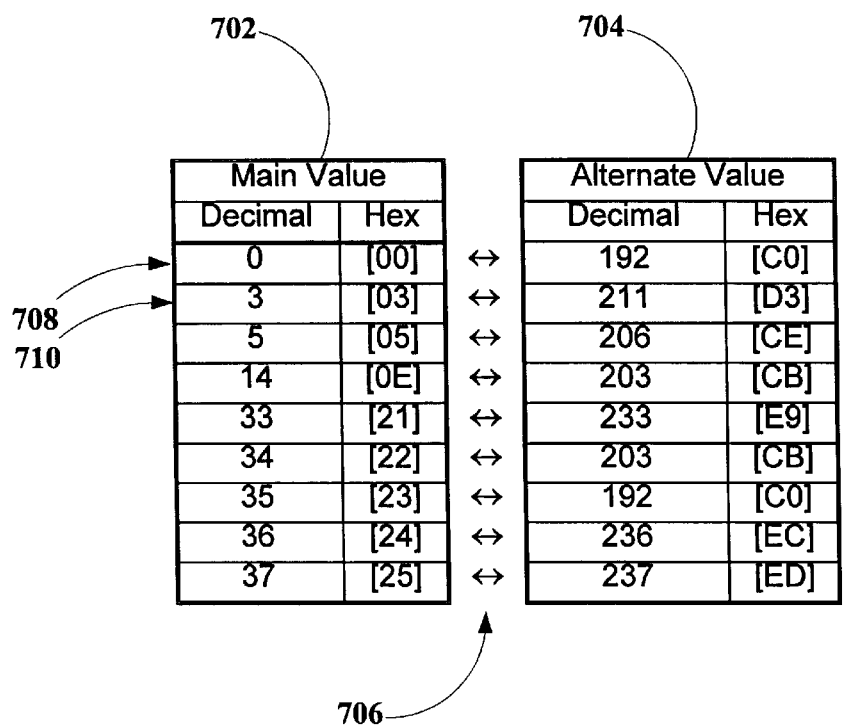
FIG. 7 shows a set of ambiguous symbols which can introduce ambiguous data into the Q-channel.

FIG. 7 shows a set of ambiguous symbols which can be used to introduce ambiguous data into the Q-channel. This is only a partial set of such symbols, but an extensive set is not necessary, because only one ambiguous symbol is needed and any one of the ambiguous symbols illustrated in FIG. 7 can be used. Ambiguous symbols, such as in FIG. 7 are described in detail in International Publication No. WO 98/08180 of PCT/IL97/00266, along with methods for writing them on Compact Disc. In FIG. 7, a table 702 gives main values for the ambiguous symbols, and a column 704 gives alternate values. Both decimal and hexadecimal ("hex") representations are shown. Double arrows 706 represent the fact that main values 702 and alternate values 704 are randomly interchanged during multiple reading operations of the ambiguous symbols. For example, an ambiguous symbol 708 has a main value of 0 and an alternate value of 192 (C0 hexadecimal). Written in binary, this ambiguous symbol is represented as 00000000←→11000000. It is readily seen that the Q-channel bit (the seventh bit) is a 0 in the main value and a 1 in the alternate value. Likewise, an ambiguous symbol 710 in binary is represented as 00000011←→11010011, which has the Q-channel bit as a 0 in the main value and as a 1 in the alternate value. Similarly, the remaining ambiguous symbols of FIG. 7 also have the property that the Q-channel bit is a 0 in one of the values and is a 1 in the other of the values.

In order to use the invalid symbols written as control and display symbols for authenticating the Compact Disc, it is necessary to be able to read the data contained in the subcode channels, and, moreover, to detect the presence of invalid data therein. Accordingly, the present invention provides methods for so doing, as described below.

Figure 8:
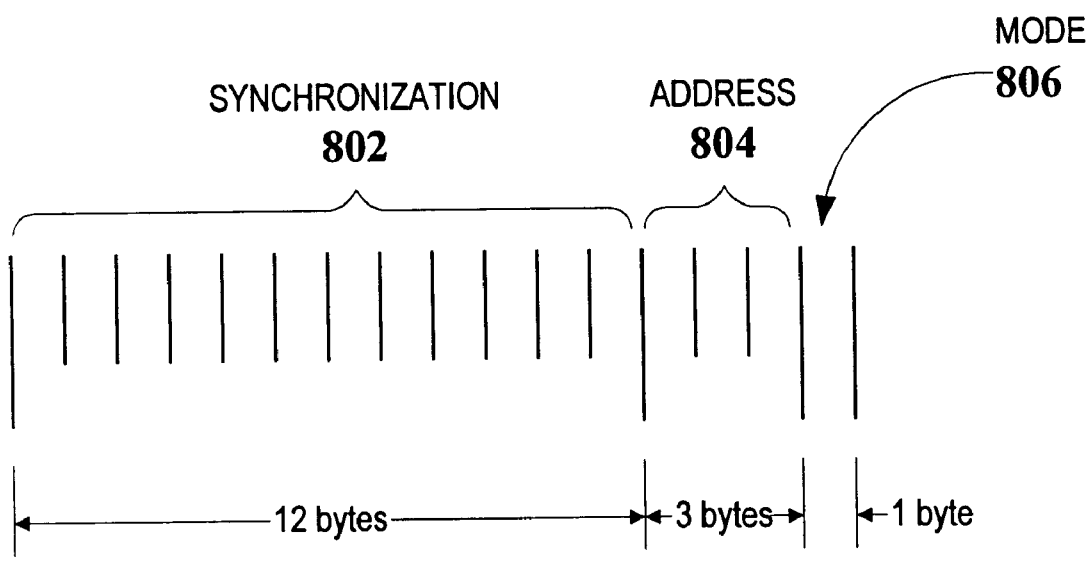
FIG. 8 shows the synchronization and header field for the prior art data blocks of a CD-ROM.

FIG. 8 shows the prior art synchronization and header field of a CD-ROM data block according to the standards. According to the standards, a data block corresponds to a sector recorded on the CD-ROM. Each block begins with a 12-byte synchronization 802 followed by a 3-byte address 804 after which comes a single byte mode 806. Following the synchronization and header field come the data bytes of the data block in a format specified by mode 806, according to the standards. Address 804 corresponds to the location of the data block on the CD-ROM, and therefore corresponds to the CD-ROM sector number where the data block is recorded. As noted previously, absolute time minutes field 220 (FIG. 2), absolute time seconds field 222 (FIG. 2), and absolute time frame field 224 (FIG. 2) together specify the approximate sector address on the Compact Disc of Q-channel data, and according to the standards, the sector address specified by the Q-channel data in this way must be within 1 second (±1 second) of the actual sector address. Moreover, the "sector offset", which is herein defined as the offset of the sector address specified by the Q-channel data from that specified by address 804, is constant for any CD-ROM. Therefore, it is possible to measure the sector offset in a location of the CD-ROM in which the Q-channel data is presumed to be valid, and then use the sector offset to determine the validity of Q-channel data elsewhere on the CD-ROM by comparing the sector address as contained in the Q-channel with address 804. Accordingly, the method of the present invention defines an "offset calibration", in which the constant sector offset is measured by reading the sector offset in a location of the CD-ROM in which the Q-channel data is presumed to be valid.

Figure 9:
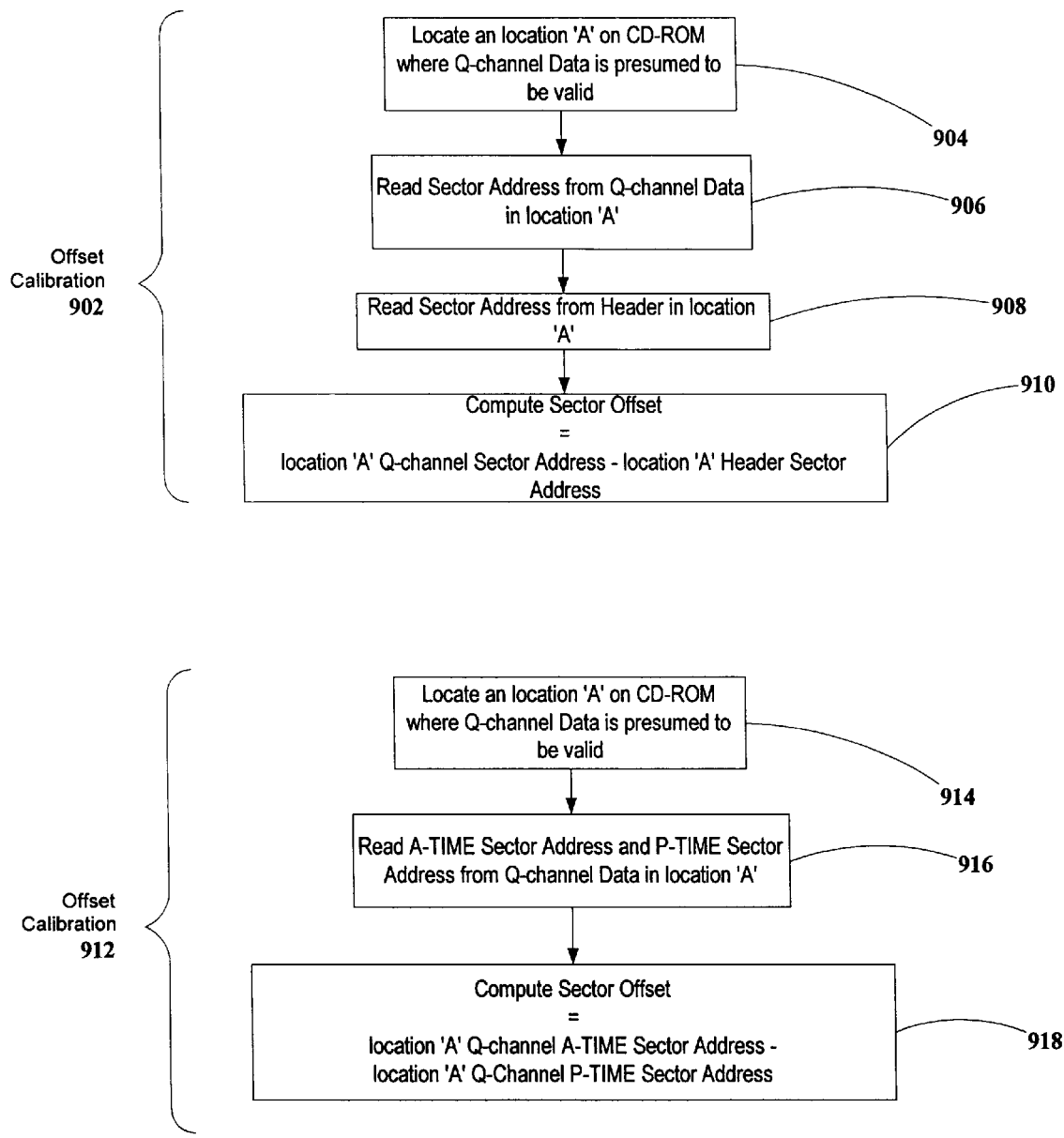
FIG. 9 shows the steps of two embodiments for performing an offset calibration.

FIG. 9 illustrates two embodiments of the method for performing an offset calibration for a CD-ROM. In a first embodiment 902, in a locating step 904, a location 'A' is located on the CD-ROM where the Q-channel data is presumed to be valid. Then, in a first reading step 906 the sector address of location 'A' is read from the Q-channel. In a second reading step 908 the sector address of location 'A' is read from the header. Finally, in a computation step 910, the sector offset is computed as the difference between the Q-channel sector address of location 'A' and the header sector address of location 'A'. That is, $$O = Q_A - H_A \qquad (1)$$

where O is the sector offset, $Q_A$ is the Q-channel sector address of location 'A', and $H_A$ is the header sector address of location 'A'. Given O, it is easy to find the correct value of the Q-channel sector address in another location, denoted here as location 'B', from the header sector address of location 'B'. Since header sector addresses are valid everywhere on the CD-ROM and O is constant, Equation (1) shows that $$Q_B = H_B + O \qquad (2)$$

where $Q_B$ is the correct value of the valid Q-channel sector address in location 'B', and $H_B$ is the header sector address of location 'B'.

In a second embodiment 912, the offset calibration relies on the relationship between the absolute time ("A-TIME") and the playing time ("P-TIME"), which have a constant time offset within any given track on the Compact Disc. FIG. 2 shows the location of P-TIME data in the Q-channel. Field 212 contains the P-TIME minutes data, field 214 contains the P-TIME seconds data, and field 216 contains the P-TIME frame data. Then, in a single reading step 916 (FIG. 9) the A-TIME sector address of location 'A' and the P-TIME sector address of location 'A' are both read from the same Q-channel data. Finally, in a computation step 918, the time offset is computed as the difference between the A-TIME sector address and the P-TIME sector address in the Q-channel data of location 'A'. That is, $$T = Q_A - Q_P \qquad (3)$$

where T is the time offset, $Q_A$ is the Q-channel sector address of location 'A' (the A-TIME), and $Q_P$ is the playing time of location 'A'. Given T, it is easy to find the correct value of the Q-channel sector address in another location, denoted here as location 'B', from the playing time of location 'B'. Since header playing time data is valid everywhere on the Compact Disc and T is constant within a given track, Equation (3) shows that $$Q_B = Q_P + T \qquad (4)$$

where $Q_B$ is the correct value of the valid Q-channel sector address in location 'B', and $Q_P$ is the playing time in location 'B'. Note that location 'A' and location 'B' must be in the same track for T to be constant.

If invalid data has been written into the Q-channel of an original CD-ROM in location 'B', Equation (2) can be used to determine if an undetermined instance of the CD-ROM is an original CD-ROM or an unauthorized copy. If the Q-channel data of the undetermined instance agrees with Equation (2), then the undetermined instance has valid Q-channel data and is therefore an unauthorized copy. Otherwise, the Q-channel data of the undetermined instance is invalid data, and the undetermined instance is therefore an original Compact Disc. As previously specified, invalid data herein corresponds to one or more invalid symbols in the control and display symbol location in location 'B'. Also as previously specified, invalid symbols include, but are not limited to, incorrect symbols, ambiguous symbols, and undefined symbols.

Figure 10:
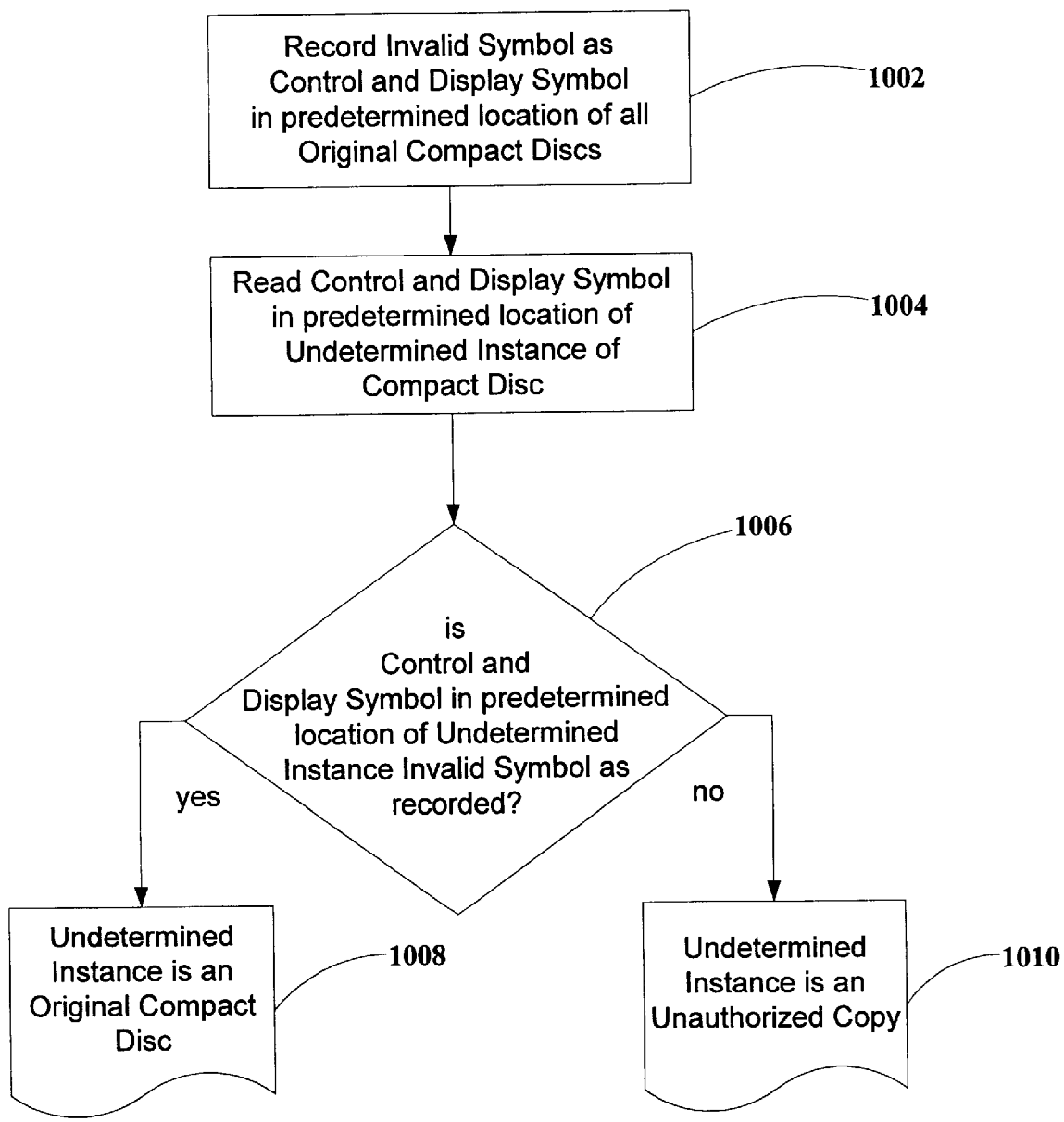
FIG. 10 shows the steps in performing the basic authentication method according to the present invention.

Thus, the steps of the basic authentication method according to the present invention include the following, as illustrated in FIG. 10:

1. Record at least one invalid symbol as the control and display symbol in a predetermined location of all original Compact Discs to be authenticated, in a recording step 1002.
2. Read the control and display symbol in the same predetermined location of an undetermined instance of the Compact Disc in a reading step 1004.
3. In a decision step 1006, if the control and display symbol of the predetermined location is an invalid symbol as recorded on the original Compact Discs, the undetermined instance is determined to be an original Compact Disc in an output step 1008. Otherwise, if the control and display symbol in the selected location (location 'B') is not an invalid symbol as recorded on the original Compact Discs, the undetermined instance is determined to be an unauthorized copy in an output step 1010.

As detailed herein, an invalid symbol recorded as a control and display symbol will result in the reading of invalid data in one or more of the subcode channels encoded by that control and display symbol. There are several different variations for recording invalid symbols and many different variations in placing the invalid symbols, which result in the invalid data appearing in various subcode channels and in different data fields within those subcode channels. Several of these variations appear as non-limiting examples below, using the Q-channel as a subcode channel for the invalid data to appear. There are several different ways to determine the validity of Q-channel data, depending on the nature of the invalid data, as described below.

Figure 11:
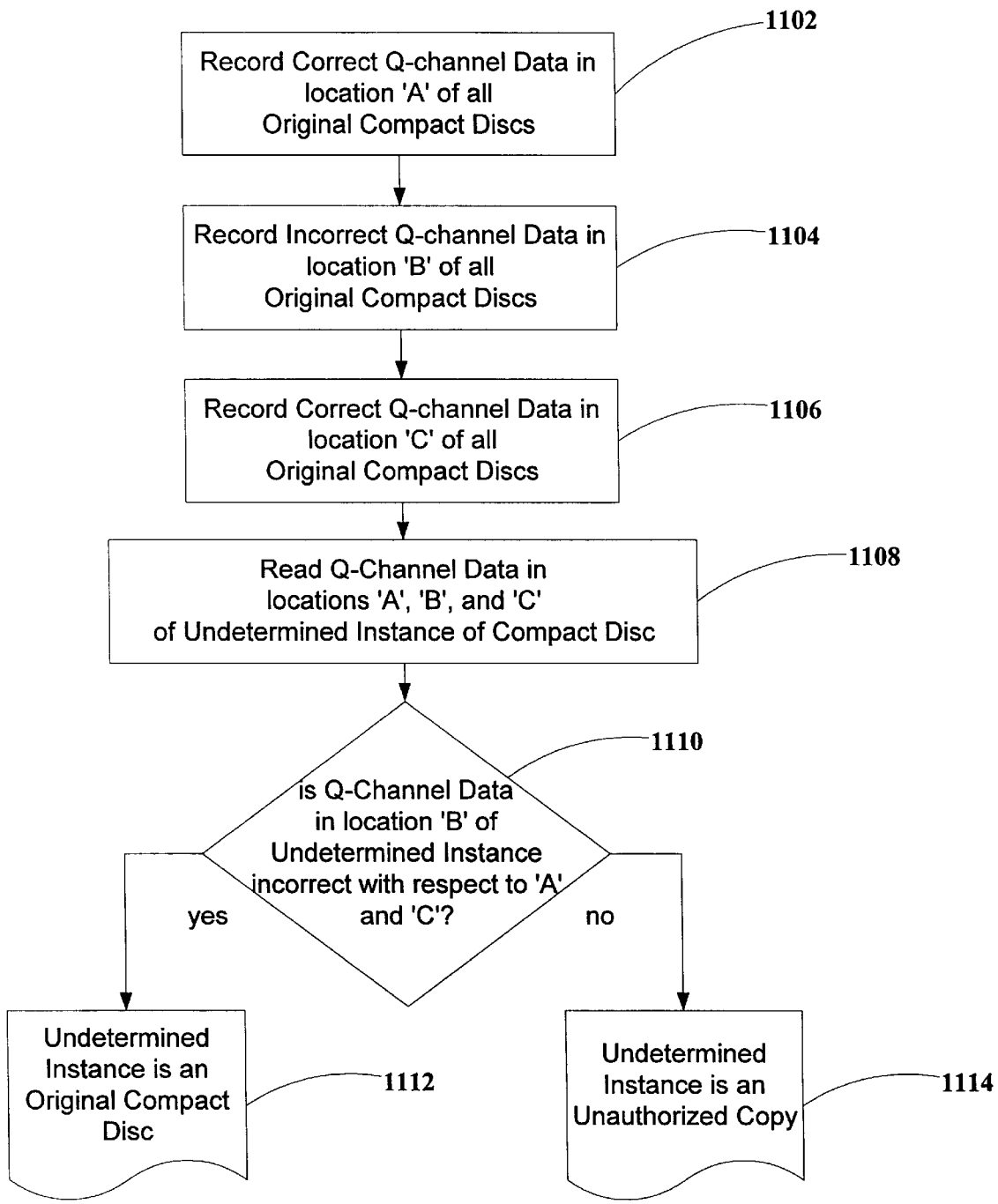
FIG. 11 shows the steps in performing an authentication method for use with incorrect Q-channel data.

If the invalid data is implemented with one or more incorrect symbols, such as those depicted in FIG. 4, as described previously, then a single reading operation suffices to make the determination. FIG. 3 illustrates the contents of the Q-channel when valid, correct symbols are written as described previously, whereas FIG. 5 illustrates the contents of the Q-channel when incorrect symbols are written as described previously. Accordingly, FIG. 11 shows the steps of a method of authentication according to the present invention for using incorrect symbols in the Q-channel. The first step is to record correct Q-channel data in a first location ('A') of all original Compact Discs to be authenticated in a first recording step 1102. For example, this data could be the data 304 illustrated in FIG. 3, where location 'A'includes 75 contiguous sectors of information extending from an absolute time location on the track of 03 minutes 40 seconds 00 frames to an absolute time location on the track of 03 minutes 40 seconds 74 frames, and containing the correct absolute time location information as specified by the standards. The second step is to record incorrect Q-channel data in a second location ('B') of all original Compact Discs to be authenticated in a second recording step 1104. For example, this data could be the data 506 illustrated in FIG. 5, where location 'B' includes 75 contiguous sectors of information extending from an absolute time location on the track of 03 minutes 41 seconds 00 frames to an absolute time location on the track of 03 minutes 41 seconds 74 frames, but containing incorrect absolute time location information which erroneously indicates these locations to be from an absolute time location on the track of 03 minutes 40 seconds 00 frames to an absolute time location on the track of 03 minutes 40 seconds 74 frames. Note that this writing of incorrect Q-channel data in location 'B' includes the writing of a new CRC in a writing operation 424 (FIG. 4) corresponding to the incorrect Q-channel data, as previously described. The third step is to record correct Q-channel data in a third location ('C') of all original Compact Discs to be authenticated in a third recording step 1106. For example, this data could be the data 308 illustrated in FIG. 3, where location 'C' includes 75 contiguous sectors of information extending from an absolute time location on the track of 03 minutes 42 seconds 00 frames to an absolute time location on the track of 03 minutes 42 seconds 74 frames, and containing the correct absolute time location information as specified by the standards. Note that in this example, location 'A', location 'B', and location 'C' encompass 225 contiguous sectors. The next step is to read locations 'A', 'B', and 'C' of an undetermined instance of the Compact Disc in a reading operation 1108. Next, in a decision point 1110, the Q-channel data in location 'B' is compared against that of location 'A' and location 'C'. In this example, the correct value of the Q-channel data in location 'B' is shown as data 306 of FIG. 3 (indicating these locations to be from an absolute time location on the track of 03 minutes 41 seconds 00 frames to an absolute time location on the track of 03 minutes 41 seconds 74 frames). If the Q-channel data of location 'B' follows correctly after that of location 'A' and correctly before that of location 'C', then location 'B' has correct Q-channel data. Otherwise, location 'B' has incorrect Q-channel data. In one embodiment of the present invention, the correctness of the Q-channel data of location 'B' can be determined by a comparison with that of location 'A' alone; in another embodiment of the present invention, the correctness of the Q-channel data of location 'B' can be determined by a comparison with that of location 'C' alone; in still another embodiment of the present invention, the correctness of the Q-channel data of location 'B' can be determined by a comparison with that of that of both location 'A' and location 'C' together. In yet another embodiment of the present invention, the correctness of the Q-channel data of location 'B' can be determined without any comparison by scanning the Compact Disc for Q-channel data that indicates an absolute time location on the track of anywhere from 03 minutes 41 seconds 00 frames to an absolute time location on the track of 03 minutes 41 seconds 74 frames. If such a time is present in any sector, there is necessarily correct data in location 'B'. Otherwise, if such a time is not present anywhere on the Compact Disc, then there exists a location 'B' whose Q-channel data is incorrect. By whichever means is most convenient, if decision point 1110 results in a finding that the Q-channel data of location 'B' is incorrect, then in an output step 1112 the undetermined instance of the Compact Disc is determined to be an original Compact Disc. Otherwise, in an output step 1114 the undetermined instance of the Compact Disc is determined to be an unauthorized copy.

Figure 12:
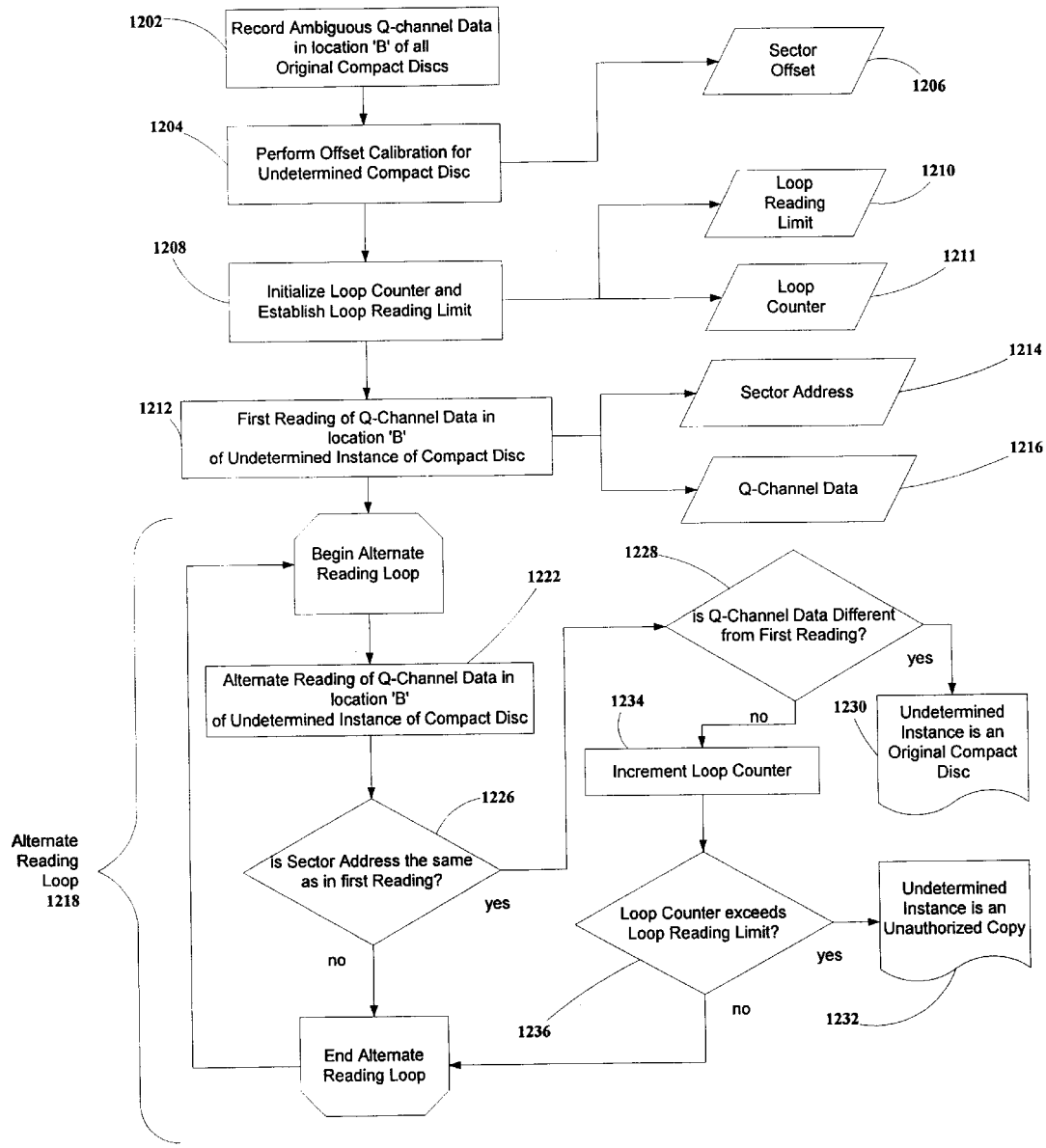
FIG. 12 shows the steps in performing an authentication method for use with ambiguous Q-channel data.

The use of incorrect symbols as described above has the property that the validity of Q-channel data can be determined by a single reading operation possibly involving only comparisons with other Q-channel data. It is also possible to achieve greater security in the authentication process by utilizing ambiguous symbols, but when doing so, it is necessary to make multiple reading operations of the same Q-channel data, and to be able to compare the Q-channel location information with the sector address information in the sector headers. Therefore, the method according to the present invention for authenticating a Compact Disc using ambiguous symbols involves multiple reading operations, as illustrated in FIG. 12. In order to determine if a symbol is an ambiguous symbol, it is necessary to make multiple readings of that symbol's data values and compare the data values read in the multiple readings to see if the data values are the same or different. If different data values are read, the symbol is an ambiguous symbol. If a sufficient number of readings are made and all the data values are the same, the symbol can be statistically considered not to be an ambiguous symbol. Following is a description of how this can be done in terms of reading Q-channel data.

In a preferred embodiment of the present invention, in a recording step 1202, ambiguous data is recorded in the Q-channel in a selected location 'B' of all original Compact Discs to be authenticated. Recall that the ambiguous symbols to be recorded as control and display symbols must put ambiguous data in the Q-channel, and should be selected as described herein and illustrated in FIG. 7. The recording operation also involves recording a new CRC in a recording operation 624 as illustrated in FIG. 6. Next, in an offset calibration step 1204, a sector offset 1206 is determined. A step 1208 sets a loop reading limit 1210 and initializes a loop counter 1211. Then, in a step 1212, a first reading of Q-channel data in location 'B' of an undetermined instance of the Compact Disc results in a sector address 1214 and Q-channel data 1216. Having read location 'B' in a first reading, it is necessary to read location 'B' again a number of times to determine if the Q-channel data in location 'B' randomly reads different values. If so, then this data is ambiguous data, and the undetermined instance is an original Compact Disc. Otherwise, if the Q-channel data consistently reads the same values, the data is not invalid data, and the undetermined instance is considered as an unauthorized copy. In cases where a different value of the Q-channel data appears on the next reading operation, the Q-channel data can be immediately determined to be ambiguous data. There is only a probability of reading a different value, however, so multiple readings must be used. Loop reading limit 1210 determines how many times the same Q-channel data will be read in a set of alternate readings before considering the Q-channel data to be not ambiguous data. Alternate reading takes place in an alternate reading loop 1218. In alternate reading loop 1218, an alternate reading step 1222 attempts to repeat the reading of the Q-channel data in location 'B' of the undetermined instance of the Compact Disc. This is considered only an attempt to read the Q-channel data in location 'B', because the standards specify that a player shall be able to read Q-channel data within±75 sectors of a requested location, and many players therefore do not necessarily read a precisely-specified Q-channel data location, but rather any nearby Q-channel data location conforming to the standards. To read and detect ambiguous data, however, it is necessary to read precisely the same data repeatedly. Therefore, according to the present method, attempted alternate readings are performed, and the returned data from each alternate reading is compared with that of first reading 1212 in a decision point 1226. The actual sector address of the Q-channel data from first reading 1212 can be determined by using sector offset 1206 from offset calibration 1204, and this assists in reading the proper Q-channel data, such as by using Equation (2). However, in many players, the Q-channel data is read independently of the regular sector data, so this technique still yields only an approximate location for the desired Q-channel data. Regardless of how the Q-channel data is located, however, only if the sector address corresponding to the Q-channel data of first reading 1212 is returned by alternate reading 1222 is the Q-channel data of alternate reading 1222 used to determine if the Q-channel data is ambiguous data. Thus, at decision point 1226, if the Q-channel data returned by alternate reading 1222 corresponds to a sector address different from that of first reading 1212, then alternate reading loop 1218 continues. If, however, the Q-channel sector address of alternate reading 1222 corresponds to that of first reading 1212, the Q-channel data from alternate reading 1222 is compared to that of first reading 1212 in a decision point 1228. If the Q-channel data from alternate reading 1222 is different from that of first reading 1212, then the undetermined instance of the Compact Disc is reported to be an original Compact Disc in an output step 1230. If, however, the Q-channel data from alternate reading 1222 is not different from that of first reading 1212, then loop counter 1211 is incremented in a step 1234. At a decision point 1236, loop counter 1211 is compared with loop reading limit 1210. If loop counter 1211 does not exceed loop reading limit 1210, then alternate reading loop 1218 continues. If, however, loop counter 1211 exceeds loop reading limit 1210, then the undetermined instance of the Compact Disc is reported to be an unauthorized copy in an output step 1232. Note that this does not absolutely determine that the Q-channel data is not ambiguous data, but rather that, for a suitably set loop reading limit 1210, the probability is high that the Q-channel data is not ambiguous data.

It will be appreciated that the recording of material in all original Compact Discs to be authenticated depends on the nature of the media chosen. If, for example, the authorized copies of the original Compact Disc are made individually on special CD recording equipment which is able to implement the recording of invalid symbols as described herein, each separate instance of an original Compact Disc must be so recorded on the special CD recording equipment. On the other hand, if the Compact Disc is to be mass-manufactured by commercial CD pressing techniques, as is commonly done in the art, then it is sufficient to record the invalid symbols as described herein only once, upon the master used in the pressing process.

While the invention has been described with respect to a limited number of embodiment, it will be appreciated that many variations, modifications and other application of the invention may be made.

What is claimed is:

1. A method for authenticating an undetermined instance of an Optical Disc as being an original Optical Disc distinct from an unauthorized copy thereof, the undetermined instance selected from the set of all copies of Optical Discs corresponding to original Optical Discs to be authenticated, the method comprising the steps of:

recording at least one invalid symbol in a control and data byte on all original Optical Discs to be authenticated, said at least one invalid symbol selected from the group consisting of incorrect symbols, undefined symbols, and ambiguous symbols, said recording being in at least one of the Q-channel components of said control and data byte on said all original Optical Discs to be authenticated;

reading the control and data byte of the undetermined instance in said predetermined location;

comparing said control and data byte from said reading with said at least one invalid symbol of said recording; and determining the undetermined instance to be an original Optical Disc if said control byte from said reading is the same as said at least one invalid symbol of said recording, and determining the undetermined instance to be an unauthorized copy if said control and data byte from said reading is different from said at least one invalid symbol of said recording.

2. The method as in claim 1 wherein said recording comprises the recording of at least one invalid symbol in said Q-channel.

3. The method as in claim 1, wherein said invalid symbol is an ambiguous symbol having two distinct data values, and wherein said reading further comprises the steps of:

i) making a first reading of said ambiguous symbol and storing the data value thereof; and ii) making a plurality of alternate readings of said ambiguous symbol, and storing the data value thereof.

4. The method as in claim 3, wherein said comparing said control and display symbol from said reading with said at least one invalid symbol of said recording further comprises the steps of:

(a) setting a predetermined limit to the number of said alternate readings;

(b) comparing the data value of said first reading with the data value of each of said alternate readings; and (c) determining said control and display symbol to be the same as the invalid symbol of said recording if the data value of said first reading is distinct from the data value of said alternate reading; and (d) determining said control and display symbol to be different from the invalid symbol of said recording if said predetermined limit is exceeded.

* * * * *